March 21, 1944.    W. J. A. BAILEY    2,344,585
DEVICE FOR ANALYZING PERFORATED DATA APPEARING
IN ADJACENT FIELDS OF RECORD MEDIA
Filed Aug. 28, 1943
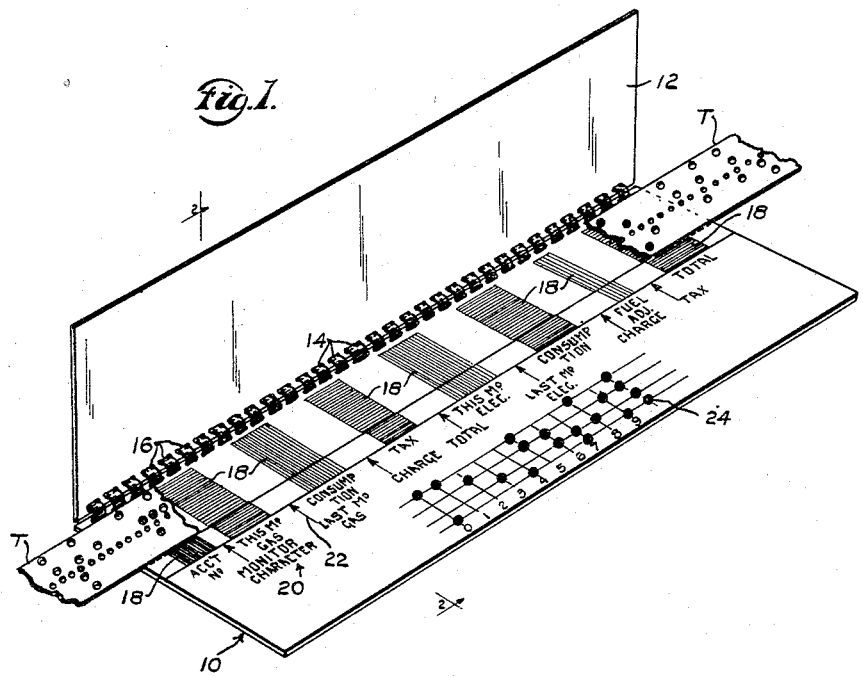
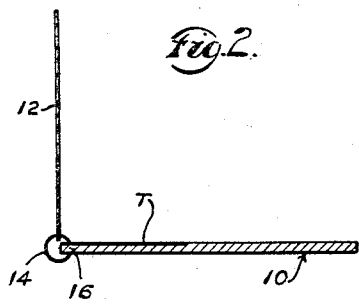
INVENTOR,
William J. A. Bailey.
BY
ATTORNEY Patented Mar. 21, 1944

2,344,585

UNITED STATES PATENT OFFICE 2,344,585

DEVICE FOR ANALYZING PERFORATED DATA APPEARING IN ADJACENT FIELDS OF RECORD MEDIA

William J. A. Bailey, Packanack Lake, N. J., assignor to International Business Machines Corporation, New York, N. Y., a corporation of New York Application August 28, 1943, Serial No. 500,436

6 Claims. (Cl. 35—2)

The present invention relates to apparatus for analyzing data which appears in the form of code perforations falling in adjacent fields of a perforated record medium, such as telegraphic type accounting tape or the like.

The invention has been illustrated in connection with the strip of telegraphic type tape, which has been perforated according to a selected code and which represents a billing data tape employed by public utility corporations for the commodity billing of individual consumers of gas and electricity, but it will be distinctly understood that the invention may, by suitable modification, be employed in connection with the analyzing of perforated code data appearing in various other types of record media, as for example, cards which have been perforated according to the well-known Hollerith system and in which the code perforations are representative of a great variety of data, such as sales analysis data, geographical data, or, in fact, informative data of any sort.

Where telegraphic type tape which has been perforated according to a selected code is concerned, and in the case of commodity billing, the various consumers are ordinarily billed under respective account numbers. Successive accounts are separated on the continuous tape by two or more unperforated blank spaces or sections and the account numbers usually appear in the first field of each account on the tape. The accounting data employed by different public utility corporations may very considerably differ and, in the present instance, a strip of tape perforated according to a typical accounting system, wherein the various consumers are billed for the consumption of gas in cubic feet and electricity in kilowatt hours, is presented for analysis by means of the analyzing device comprising the present invention.

Following the account number in each account on the tape there appears a monitor character. This monitor character occupies a field by itself in a single index point position and is expressive of the type of rate for which the consumer is to be billed, as for example, commercial or residential gas and commercial or residential electricity, or any combination of these. The monitor character may then be followed by this month's gas reading, last month's gas reading, a consumption figure which represents the difference between the two previous readings, the charge in dolllars and cents, the tax charge and the total charge for gas consumption, all in a plurality of index point positions. Each of these various items occupies one or more index point positions in an individual field on the tape. Following the various data relating to gas consumption, similar data relating to the consumption of electricity may appear on the tape, each item being wholly contained within its own individual field. The last item appearing in each account will ordinarily be the total charge for consumption of both gas and electricity.

Heretofore, the various operators of accounting machinery have experienced considerable difficulty in analyzing the data appearing on a continuous strip of telegraphic tape. Ordinarily, in order to analyze any particular account appearing on the tape, it has been necessary for the operator to first locate the desired account by tracking down the various account numbers appearing in the first field of each account and thereafter, by laborious process of counting off the various fields from left to right along the tape, make his analysis. This present invention is designed to overcome the above noted limitations that are attendant upon analysis of perforated data appearing on an accounting tape, and toward this end contemplates the provision of a relatively simple data analyzer in the form of a card upon which the tape may be placed and across which the tape may be drawn. The card is approximately of a length equal to the length consumed by each individual account appearing on the tape and the card is so marked that the operator may, by the simple expedient of aligning the first field of each individual account with one edge of the card, readily obtain a visual separation of the various fields in the account for quick reference.

The card has printed or otherwise marked thereon a plurality of differently colored bands or regions upon which the tape is adapted to rest during analysis thereof. These bands or regions are successively arranged along the card and are of the proper width and length so that each band transversely underlies a respective field appearing on the tape. The bands are at least as long as the width of the tape and are preferably slightly longer and thus along one edge of the tape the various fields may be visually selected, while at the same time the consumers of the bands show up through the tape in the perforated regions thereof so that the perforations in each field appear to be colored differently from the perforations appearing in its next adjacent field. The legends are conveniently positioned adjacent the respective bands or fields to which they apply and thus by properly orienting the tape with respect to the card the operator is enabled at a single glance to locate any particular field he desires and to make the necessary analysis thereof. For the benefit of the inexperienced operator a representation of the selected code is applied at a convenient space on the card.

The device is shown in the accompanying drawing:

Fig. 1 illustrates in perspective a card which has been marked according to the principles outlined above, together with a transparent cover thereover and across which card the tape is manually slidable.

Fig. 2 is a sectional view taken substantially along the plane 2—2 of Fig. 1.

Referring now to the drawing in detail, the analyzing device includes a generally rectangular card 10, together with a transparent cover 12 therefor of substantially the same size and configuration. The cover 12 is hinged to the card 10 along one edge of the latter in any suitable manner and, in the present instance, the connecting means between the card and cover is in the form of a pair of Celluloid or other plastic spiral hinge members 14 of conventional design. The hinge members 14 pass through a series of perforations 16 provided in both the card and cover in registry with each other.

Printed or otherwise marked upon the card 10 adjacent its upper edge are a series of colored bands 18 of equal width arranged in contiguity. For the purpose of commodity billing, wherein the various consumers are billed for the consumption of gas in cubic feet and electricity in kilowatt hours, fifteen such bands are employed. Each band is of a different color from the bands next adjacent thereto and, if desired, each band may be colored differently from all of the other bands. It is sufficient, however, that no one particular band be colored similar to the coloring of an adjacent band, and accordingly in the present instance only three colors are employed, these colors being, namely, white, blue and red. A series of legends are designated at 20 and each legend is printed on the card in a suitable region below the various bands 18 and in close proximity to the particular band to which the legend pertains. Lead lines 22 may be employed to assist in identifying each legend with its respective band.

The particular legends employed in the present instance, reading from left to right across the card, are, first, the account number, followed by a monitor character, this month's gas reading, last month's gas reading, consumer's figure, charge in dollars and cents, tax in dollars and cents, total in dollars and cents, this month's electric reading, last month's electric reading, the consumption figure in dollars and cents, the charge in dollars and cents, the fuel adjustment charge in dollars and cents, the tax in dollars and cents and the total charge for the consumption of both gas and electricity. Since the use of only three colors for the various bands 18 has been resorted to, the legends relating to the account number, last month's gas reading, the tax for gas consumption, last month's electric reading and the fuel adjustment charge are associated with white bands 18. The legends relating to the monitor character, consumption figure for gas, total charge for gas, consumption figure for electricity and the tax charge for electricity are associated with red bands 18. The legends relating to this month's gas reading, the charge for gas consumption, this month's electric reading, charge for electric consumption and the total charge are associated with blue bands 18.

A fragment of a continuous strip of tape which it is desired to analyze is designated at T. The tape is adapted to be inserted in the device between the transparent cover 12, through which it is visible, and the card 10 and arranged along the upper hinged edges of these two members as shown. When an analysis of a particular account appearing on the tape is to be made, the operator may, by drawing the tape across the card manually, align the account number of the desired account with the first red band 18 appearing on the card. When this is done, the various fields appearing on the tape in the desired account number will fall above their respective colored band 18 in the series thereof. Because of the fact that each band is colored differently from its neighbor, and because of the fact that the bands are not only as wide as, but slightly wider than, the width of the tape, the colors of the bands will show up through the perforations of the tape, thereby rendering it comparatively easy for the operator to distinguish the various fields of the tape. The small portion of each band which projects below the edge of the tape further assists the operator in quickly finding the field he desires to analyze.

If an operator is engaged in intensive analysis of a series of accounts appearing on a single continuous strip of tape when he has finished analyzing one account, it is merely necessary for him to draw the tape through the device from right to left until the next account is properly aligned on the card 10. Such alignment is readily facilitated by virtue of the fact that adjacent accounts are separated by two or more spaces, and thus when a desired account is aligned on the card 10 that portion of the tape which is positioned just off each end of the card 10 will be imperforate.

For the convenience of an operator who may not be experienced in reading the particular code of the accounting system employed, a space is provided adjacent the bottom of the card 10 for the printing of a diagram 24 representative of the code. The diagram 24, shown in the accompanying drawing, illustrates a code which is known as the Telelector code. This code is essentially a four-line code and is concerned only with the numerals of the Arabic system, together with three special characters which may be employed for any desired purpose in the accounting system.

The invention is not to be limited to the exact arrangement shown in the accompanying drawing or described in this specification as various changes in the details thereof may be resorted to without departing from the spirit of the invention. For example, the card is useful not only in analyzing telegraphic type tape, which has been perforated according to a selected code representative of the various numerals of the Arabic system, but it may, by suitable modification, be employed for analysis of tape which has been perforated according to a different code representative of either the Arabic numerals or letters of the alphabet. Furthermore, the analyzing card may, by suitable modification, be designed for use in connection with analysis of individual cards which may be perforated according to the Hollerith system. The specific colors chosen for the bands 18 are not critical and any combination of two or more colors may be employed. In certain instances the bands 18 may, if desired, be simple black and white bands alternately arranged and, in such a case, a very distinct separation of the adjacent fields may visibly be obtained. Only insofar as the invention has been particularly pointed out in the accompanying claims is the same to be limited.

What is claimed is:

1. A device for analyzing perforated data appearing in adjacent fields of a record medium wherein the fields are of predetermined widths to accommodate one or more index point positions within the fields and are arranged in a predetermined order lengthwise of the record medium, a backing card having a plurality of appropriately defined transverse band-like areas thereon arranged in a row in contiguity in transverse alignment and of substantially equal length, said appropriately defined band-like areas corresponding in number to the number of fields appearing on the record medium which it is desired to analyze and each area being of a width substantially equal to the width of a respective field on said record medium, said band-like areas being arranged relative to one another so as to underlie their respective fields on the record medium when the latter is positioned on said card in overlying relationship with respect to said row of band-like areas.

2. A device for analyzing perforated data appearing in adjacent fields of a record medium wherein the fields are of predetermined widths to accommodate one or more index point positions within the fields and are arranged in a predetermined order lengthwise of the record medium, a backing card of a width substantially greater than the width of said record medium and having a plurality of appropriately defined transverse band-like areas thereon arranged in contiguity in a row in transverse alignment and of substantially equal length, adjacent band-like areas being of a contrasting nature in appearance, said band-like areas corresponding in number to the number of fields appearing on the record medium and each being of a width equal to the width of a respective field on said record medium, said band-like areas being arranged relative to one another so as to underlie their respective fields on the record medium when the latter is positioned on said card in overlying relationship with respect to said band-like areas.

3. A device for analyzing perforated data appearing in adjacent fields of a record medium wherein the fields are of predetermined widths to accommodate one or more index point positions within the fields and are arranged in a predetermined order lengthwise of the record medium, a backing card of a width substantially greater than the width of said record medium and having a plurality of appropriately defined transverse band-like areas thereon arranged in contiguity in a row in transverse alignment and of substantially equal length, adjacent band-like areas being of a contrasting nature in appearance, said band-like areas corresponding in number to the number of fields appearing on the record medium and each being of a width equal to the width of a respective field on said record medium, said band-like areas being arranged relative to one another so as to underlie their respective fields on the record medium when the latter is positioned on said card in overlying relationship with respect to said band-like areas, and a plurality of legends on said card, each legend being positioned on the card in the vicinity of a respective band-like area, said legends being explanatory of the particular field on the record medium which its respective band-like area underlies.

4. A device for analyzing perforated data appearing in adjacent fields of a record medium wherein the fields are of predetermined widths to accommodate one or more index point positions and are arranged in predetermined order lengthwise of the record medium, a backing card having a plurality of transverse band-like areas thereon arranged in contiguity in a row in transverse alignment and of substantially equal length, means visually distinguishing adjacent band-like areas from each other, said band-like areas corresponding in number to the number of fields appearing on the record medium, said band-like areas being arranged relative to one another so as to become aligned with their respective fields on the record medium when the record medium is positioned on said card in close proximity to said row of band-like areas.

5. A device for analyzing perforated data appearing in adjacent fields of a record medium wherein the fields are of predetermined widths to accommodate one or more index point positions and are arranged in predetermined order lengthwise of the record medium, a backing card having a plurality of transverse band-like areas thereon arranged in contiguity in a row in transverse alignment and of substantially equal length, means visually distinguishing adjacent band-like areas from each other, said band-like areas corresponding in number to the number of fields appearing on the record medium, said band-like areas being arranged relative to one another so as to become aligned with their respective fields on the record medium when the record medium is positioned on said card in close proximity to said row of band-like areas, said card being of a width substantially greater than the width of said record medium and having marked thereon visible legends pertaining to respective fields on the record medium, said legends being positioned adjacent the respective band-like areas applicable to their respective legends.

6. A device for analyzing perforated data appearing in adjacent fields of a record medium wherein the fields are of predetermined widths to accommodate one or more index point positions within the fields and are arranged in a predetermined order lengthwise of the record medium, a backing card having a plurality of transverse band-like areas thereon arranged in a row in contiguity in transverse alignment and of substantially equal length, means visually distinguishing adjacent band-like areas from each other, said band-like areas corresponding in number to the number of fields appearing on the record medium which it is desired to analyze and each area being of a width substantially equal to the width of a respective field on said record medium, said band-like areas being arranged relative to one another so as to underlie their respective fields on the record medium when the latter is positioned on said card in overlying relationship with respect to said row of band-like areas, and a transparent cover member substantially coextensive with said card and hinged to the latter adjacent one longitudinal edge thereof, said cover being adapted to overlie the record medium when the latter is in position on said card.

WILLIAM J. A. BAILEY.